United States Patent
Moon et al.

(10) Patent No.: US 10,089,460 B2
(45) Date of Patent: Oct. 2, 2018

(54) BEHAVIOR-BASED MALICIOUS CODE DETECTING APPARATUS AND METHOD USING MULTIPLE FEATURE VECTORS

(71) Applicant: ELECTRONICS AND TELECOMMUNICATIONS RESEARCH INSTITUTE, Daejeon (KR)

(72) Inventors: Dae Sung Moon, Daejeon (KR); Ik Kyun Kim, Daejeon (KR); Yang Seo Choi, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 86 days.

(21) Appl. No.: 15/169,259

(22) Filed: May 31, 2016

(65) Prior Publication Data

US 2017/0193225 A1  Jul. 6, 2017

(30) Foreign Application Priority Data

Jan. 4, 2016  (KR) .................. 10-2016-0000353

(51) Int. Cl.
*G06F 21/55* (2013.01)
*G06N 99/00* (2010.01)

(52) U.S. Cl.
CPC ........... *G06F 21/55* (2013.01); *G06N 99/005* (2013.01); *G06F 2221/034* (2013.01)

(58) Field of Classification Search
CPC .............................. G06F 21/55; G06N 99/005
See application file for complete search history.

(56) References Cited

U.S. PATENT DOCUMENTS

| | | | | |
|---|---|---|---|---|
| 6,154,844 A | * | 11/2000 | Touboul | G06F 21/51 713/164 |
| 2009/0126016 A1 | * | 5/2009 | Sobko | G06F 21/566 726/23 |
| 2009/0313699 A1 | | 12/2009 | Jang et al. | |
| 2015/0220733 A1 | | 8/2015 | Moon et al. | |
| 2015/0356462 A1 | | 12/2015 | Fawaz et al. | |

OTHER PUBLICATIONS

Shankarapani et al., (Kernel Machines for Malware Classification and Similarity Analysis, IEEE 2010, 6 pages).*

* cited by examiner

*Primary Examiner* — Oleg Korsak

(57) ABSTRACT

A behavior-based malicious code detecting apparatus and method using multiple feature vectors is disclosed. A malicious code learning method may include collecting characteristic factor information when a training target process comprising a malicious code is executed, generating a feature vector for malicious code verification based on the collected characteristic factor information, learning the generated feature vector through a plurality of machine learning algorithms to generate a model of representing the malicious code and a model of representing a normal file, and storing the model of representing the malicious code and the model of representing the normal file generated through the learning.

8 Claims, 9 Drawing Sheets

| Event number | Characteristic factor information name | Category |
|---|---|---|
| 1 | Createprocess | P |
| 2 | ExitProcess | P |
| 3 | TerminateProcess | P |
| 4 | OpenProcess | P |
| ... | ... | ... |
| 8 | CreateLocalThread | T |
| 9 | CreateRemoteThread | T |
| ... | ... | ... |
| 15 | ReadProcessMemory | M |
| 16 | WriteProcessMemory | M |
| 17 | HeapCreate | M |
| ... | ... | ... |
| 20 | CreateFile | F |
| 21 | CopyFile | F |
| 22 | MoveFile | F |
| ... | ... | ... |
| 29 | CreateRegistry | R |
| 30 | DeleteRegistry | R |
| 31 | OpenRegistry | R |
| 32 | ReadRegistry | R |
| ... | ... | ... |
| 34 | Connect | N |
| 35 | Listen | N |
| ... | ... | ... |
| 39 | CreateService | S |
| 40 | DeleteProcess | S |
| ... | ... | ... |
| 43 | CreateMutex | E |
| 44 | OpenMutex | E |
| M | ... | ... |

FIG. 3A

| COLLECTED CHARACTERISTIC FACTOR INFORMATION | COLLECTED CHARACTERISTIC FACTOR INFORMATION DESCRIPTION |
|---|---|
| ID | CHARACTERISTIC FACTOR COLLECTING ORDER |
| DATE | COLLECTING DATE |
| EN | CHARACTERISTIC FACTOR NUMBER |
| PPID | PARENT PROCESS ID |
| PID | PROCESS ID |
| TID | THREAD ID |
| UserID | USER NAME |
| ProcName | PROCESS NAME |
| PathName | EXECUTION PATH |
| EventName | CHARACTERISTIC FACTOR NAME |
| API | API NAME THAT CAUSES CHARACTERISTIC FACTOR |
| Args | PARAMETERS TO BE TRANSMITTED WHEN API IS CALLED |
| Exts | ADDITIONAL PARAMETERS TO BE TRANSMITTED WHEN API IS CALLED |

FIG. 3B

ID:277    DATE:2015-08-01 00:10:18
         EN:31 PPID:552 PID:1828 TID:4464
          UserID:PC1 ProcName:taskhost.exe
          PathName:C:₩Windows₩system32₩taskhost.exe
          EventName:OpenRegistry API:NtOpenKeyEx
          Arg0 Name:Registry Type:0x2030 RawValue:0x000000000000033c DataSize:0
          Arg1 Name:Access Type:0x1010 RawValue:0x0000000000000001 DataSize:0
          Arg2 Name:ObjectAttributes Type:0x1020 RawValue:0x0000000000000000 DataSize:24
          Arg3 Name:OpenOptions Type:0x1010 RawValue:0x0000000000000000 DataSize:0
          Ext0 Name:Return Type:0x2010 RawValue:0x0000000000000000 DataSize:0
          Ext1 Name:RegistryKeyPath Type:0x2200 RawValue:0x0000000000000000 DataSize:38
                   38 AppEvent₩Schemes₩

FIG. 4

ID:1 EN:1 PPID:2736 PID:2840
    ProcName:cmd.exe EventName:CreateProcess API:ShellExecuteExW ID:2 EN:31 PPID:2736 PID:2840
    ProcName:cmd.exe EventName:OpenRegistry API:NTOpenKeyEx ID:3 EN:31 PPID:2736 PID:2840
    ProcName:cmd.exe EventName:OpenRegistry API:NTOpenKeyEx ID:4 EN:28 PPID:2736 PID:2840
    ProcName:cmd.exe EventName:FileInformation API:NtQueryInformationFile ID:5 EN:20 PPID:2736 PID:2840
    ProcName:cmd.exe EventName:CreateFile API:test ID:1 EN:28 PPID:2840 PID:1008
    ProcName:test.exe EventName:FileInformation API:NtQueryInformationFile ID:2 EN:31 PPID:2840 PID:1008
    ProcName:test.exe EventName:OpenRegistry API:NTOpenKeyEx ID:6 EN:16 PPID:2736 PID:2840
    ProcName:cmd.exe EventName:WriteProcessMemory API:NtQueryInformationFile ID:3 EN:16 PPID:2840 PID:1008
    ProcName:test.exe EventName:WriteProcessMemory API:NtQueryInformationFile ID:4 EN:16 PPID:2840 PID:1008
    ProcName:test.exe EventName:WriteProcessMemory API:NtQueryInformationFile ID:5 EN:31 PPID:2840 PID:1008
    ProcName:test.exe EventName:OpenRegistry API:NTOpenKeyEx ID:6 EN:3 PPID:2840 PID:1008
    ProcName:test.exe EventName:TerminateProcess API:NtTerminateProcess ID:7 EN:3 PPID:2736 PID:2840
    ProcName:cmd.exe EventName:TerminateProcess API:NtTerminateProcess

FIG. 5

| Process name | PID | PPID | Characteristic factor vector | | | | | | | | | | | | | |
|---|---|---|---|---|---|---|---|---|---|---|---|---|---|---|---|---|
| | | | 1 (Create process) | 2 (Create process_CP) | ... | 5 (Terminate process) | 6 (Terminate process_CP) | ... | 31 (Write process memory) | 32 (Write process memory_CP) | ... | 39 (Create file) | 40 (Create file_CP) | ... | 55 (File information) | 56 (File information_CP) | ... | 61 (Open registry) | 62 (Open registry_CP) | ... | M*2 |
| cmd.exe | 2840 | 2736 | 1 | 0 | ... | 1 | 0 | ... | 1 | 0 | ... | 1 | 0 | ... | 1 | 1 | ... | 1 | 0 | ... | 0 |
| test.exe | 1008 | 2840 | 0 | 0 | ... | 0 | 0 | ... | 0 | 0 | ... | 0 | 0 | ... | 0 | 0 | ... | 0 | 0 | ... | 0 |

FIG. 6A

| Process name | PID | PPID | Occurrence number of characteristic factors | Occurrence order of characteristic factors ||||||| 
|---|---|---|---|---|---|---|---|---|---|---|
| | | | | 1 | 2 | 3 | 4 | 5 | 6 | 7 |
| cmd.exe | 2840 | 2736 | 8 | (1) Create process | (31) Open registry | (31) Open registry | (28) File information | (20) Create file | (16) Write process memory | (3) Terminate process |
| test.exe | 1008 | 2840 | 7 | (28) File information | (31) Open registry | (16) Write process memory | (16) Write process memory | (31) Open registry | (3) Terminate process | |

FIG. 6B

| Process name | PID | PPID | Occurrence number of characteristic factors | Occurrence order of characteristic factors for each category | | | | | | |
|---|---|---|---|---|---|---|---|---|---|---|
| | | | | 1 | 2 | 3 | 4 | 5 | 6 | 7 |
| cmd.exe | 2840 | 2736 | 8 | Process | Registry | Registry | File | File | Memory | Process |
| test.exe | 1008 | 2840 | 7 | File | Registry | Memory | Memory | Registry | Process | |

FIG. 7

BEHAVIOR-BASED MALICIOUS CODE DETECTING APPARATUS AND METHOD USING MULTIPLE FEATURE VECTORS

CROSS-REFERENCE TO RELATED APPLICATION

This application claims the priority benefit of Korean Patent Application No. 10-2016-0000353, filed on Jan. 4, 2016, at the Korean Intellectual Property Office, the disclosure of which is incorporated herein by reference.

BACKGROUND

1. Field of the Invention

Embodiments relate to a behavior-based malicious code detection apparatus and method using a multiple feature vector, and more particularly, to an apparatus and method for generating a feature vector based on characteristic factor information collected when a process is executed and verifying whether a malicious code of the process is included using the generated feature vector.

2. Description of the Related Art

Mostly, related malicious code detecting and processing technology verifies that a predetermined binary pattern is a malicious code when the predetermined binary pattern is present in a process or a file subjected to a malicious code test. Thus, binary pattern data of a malicious code needs to be managed by registering a predetermined binary pattern of the corresponding malicious code whenever the malicious code is detected.

Thus, the malicious code detection based on a binary pattern may guarantee a high detection rate and a fast detection time for a malicious code of which a binary pattern is managed. However, it is not possible to detect an unknown malicious code and a changed malicious code.

There is behavior-based malicious code detecting technology in addition to binary pattern-based malicious code detecting technology. The behavior-based malicious code detecting technology may define a behavior rule in advance, and verify a file or a process as including a malicious code when a pre-defined behavior rule exists in the file or the process.

Related behavior-based malicious code detecting technology may collect related information on a network or a personal computer (PC) of a user for the purpose of applying the defined rule. Thus, additional related information may need to be collected whenever a new rule is generated, and a correlation between a running process and a stored file may be unknown.

SUMMARY

An aspect provides an apparatus and method to enhance malicious code detecting performance by generating a feature vector based on characteristic factor information collected when a process is executed and verifying whether a malicious code is included in the process using the generated feature vector.

According to an aspect, there is provided a malicious code learning method including collecting characteristic factor information when a training target process comprising a malicious code is executed, generating a feature vector for malicious code verification based on the collected characteristic factor information, learning the generated feature vector through a plurality of machine learning algorithms to generate a model of representing the malicious code and a model of representing a normal file, and storing the model of representing the malicious code and the model of representing the normal file generated through the learning.

The generating may include generating the feature vector based on an occurrence order and an occurrence frequency of the collected characteristic factor information.

The feature vector generated based on the occurrence order may be generated from the sequentially represented characteristic factor information collected when the training target process comprising the malicious code is executed, or from sequentially represented category information corresponding to the collected characteristic factor information.

The feature vector generated based on the occurrence frequency may be generated by considering the occurrence frequency of the characteristic factor information collected in the training target process comprising the malicious code and in a child process of the training target process.

The learning may include learning the generated feature vector through a plurality of machine learning algorithms using sequential information when the generated feature vector is generated based on the occurrence order of the collected characteristic factor information.

The learning may include learning the generated feature vector through a plurality of machine learning algorithms using a vector of a fixed size when the generated feature vector is generated based on the occurrence frequency of the collected characteristic factor information.

The malicious code learning method may further include defining the characteristic factor information, wherein the characteristic factor information comprises at least one of a process category, a thread category, a file system category, a memory category, a registry category, a network category, a service category, and a category except for the process category, the thread category, the file system category, the memory category, the registry category, the network category, and the service category.

According to another aspect, there is provided a malicious code detecting method including collecting characteristic factor information when a target process to detect a malicious code is executed, generating a feature vector for malicious code verification based on the collected characteristic factor information, comparing the generated feature vector to a pre-stored model obtained through learning, and verifying whether the target process comprises the malicious code based on a result of the comparing.

The generating may include generating the feature vector based on an occurrence order and an occurrence frequency of the collected characteristic factor information.

The pre-stored model may be stored as a model of representing the malicious code and a model of representing a normal file by generating the feature vector based on characteristic factor information collected when a training target process comprising the malicious code is executed and learning the generated feature vector obtained through a plurality of machine learning algorithms.

According to still another aspect, there is provided a malicious code learning apparatus including a collector configured to collect characteristic factor information when a training target process including a malicious code is executed, a generator configured to generate a feature vector for malicious code verification based on the collected characteristic factor information, a learner configured to learn the generated feature vector through a plurality of machine learning algorithms to generate a model of representing the malicious code and a model of representing a normal file, and a storage configured to store the model of representing the malicious code and the model of representing the normal file generated through the learning.

The generator may generate the feature vector based on an occurrence order and an occurrence frequency of the collected characteristic factor information.

The malicious code learning apparatus may further include a definer configured to define the characteristic factor information, and the characteristic factor information may include at least one of a process category, a thread category, a file system category, a memory category, a registry category, a network category, a service category, and a category except for the process category, the thread category, the file system category, the memory category, the registry category, the network category, and the service category.

According to still another aspect, there is provided a malicious code detecting apparatus including a collector configured to collect characteristic factor information when a target process to detect a malicious code is executed, a generator configured to generate a feature vector for malicious code verification based on the collected characteristic factor information, a comparer configured to compare the generated feature vector to a pre-stored model obtained through learning, and a verifier configured to verify whether the target process comprises the malicious code based on a result of the comparing.

The pre-stored model may be stored as a model of representing the malicious code and a model of representing a normal file by generating the feature vector based on characteristic factor information collected when a training target process comprising the malicious code is executed and learning the generated feature vector through a plurality of machine learning algorithms.

BRIEF DESCRIPTION OF THE DRAWINGS

These and/or other aspects, features, and advantages of the invention will become apparent and more readily appreciated from the following description of embodiments, taken in conjunction with the accompanying drawings of which.

DETAILED DESCRIPTION

Hereinafter, some example embodiments will be described in detail with reference to the accompanying drawings. Regarding the reference numerals assigned to the elements in the drawings, it should be noted that the same elements will be designated by the same reference numerals, wherever possible, even though they are shown in different drawings. Also, in the description of embodiments, detailed description of well-known related structures or functions will be omitted when it is deemed that such description will cause ambiguous interpretation of the present disclosure.

It should be understood, however, that there is no intent to limit this disclosure to the particular example embodiments disclosed. On the contrary, example embodiments are to cover all modifications, equivalents, and alternatives falling within the scope of the example embodiments. Like numbers refer to like elements throughout the description of the figures.

In addition, terms such as first, second, A, B, (a), (b), and the like may be used herein to describe components. Each of these terminologies is not used to define an essence, order or sequence of a corresponding component but used merely to distinguish the corresponding component from other component(s). It should be noted that if it is described in the specification that one component is "connected", "coupled", or "joined" to another component, a third component may be "connected", "coupled", and "joined" between the first and second components, although the first component may be directly connected, coupled or joined to the second component.

The terminology used herein is for the purpose of describing particular embodiments only and is not intended to be limiting. As used herein, the singular forms "a," "an," and "the," are intended to include the plural forms as well, unless the context clearly indicates otherwise. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Various example embodiments will now be described more fully with reference to the accompanying drawings in which some example embodiments are shown. In the drawings, the thicknesses of layers and regions are exaggerated for clarity.

Figure 1:
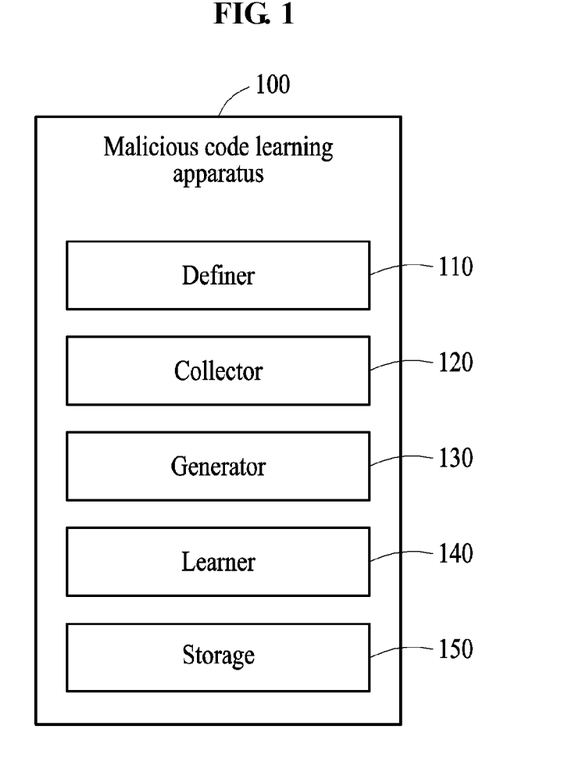
FIG. 1 is a block diagram illustrating a malicious code learning apparatus according to an example embodiment.

FIG. 1 is a block diagram illustrating a malicious code learning apparatus according to an example embodiment.

A malicious code learning apparatus 100 includes a definer 110, a collector 120, a generator 130, a learner 140, and a storage 150. Various pieces of characteristic factor information on a training target process may be created when the training target process including a malicious code is executed. The definer 110 may define the characteristic factor information for each category according to a preset rule.

The collector 120 may collect characteristic factor information defined by the definer 110 from an execution start time of the training target process including the malicious code to an execution end time of the training target process including the malicious code. The characteristic factor information defined by the definer 110 may be collected using various methods. In an example, the characteristic factor information may be collected using an application programming interface (API) hooking method.

For example, an API that causes characteristic factor information CreateProcess to create another process may include NtCreateProcess, NtCreateProcessEx, NtCreateUserProcess, CreateProcessWithLogonW, and CreateProcessWithTokenW. Thus, from the execution start time of the training target process including the malicious code to the execution end time of the training target process including the malicious code, the collector 120 may collect the characteristic factor information CreateProcess when the API that causes the characteristic factor information CreateProcess to create another process is generated.

The generator 130 may generate a feature vector for malicious code verification based on the collected characteristic factor information. The collected characteristic factor information may be reconstructed for each process, and may be reconstructed in a form of the feature vector based on an occurrence order and an occurrence frequency of the characteristic factor information.

A method of generating the feature vector based on the collected characteristic factor information will be described with reference to FIGS. 5 and 6.

The learner 140 may learn the generated feature vector through a plurality of machine learning algorithms to generate a model of representing the malicious code and a model of representing a normal file. The learner 140 may learn the feature vector through different types of machine learning algorithms in response to a method of generating the feature vector.

For example, when the feature vector is generated based on the occurrence order of the collected characteristic factor information, the learner 140 may learn the feature vector generated through a plurality of machine learning algorithms using consecutive information.

When the feature vector is generated based on the occurrence frequency of the collected characteristic factor information, the learner 140 may learn the feature vector through a plurality of machine learning algorithms using a vector of a fixed size.

The storage 150 may store a model of representing the malicious code and a model of representing a normal file generated by the learner 140. The model of representing the malicious code and the model of representing the normal file stored in the storage 150 may be updated to the model of representing the malicious code and the model of representing the normal file learned by the learner 140 when new characteristic factor information is collected by the collector 120.

Figure 2:
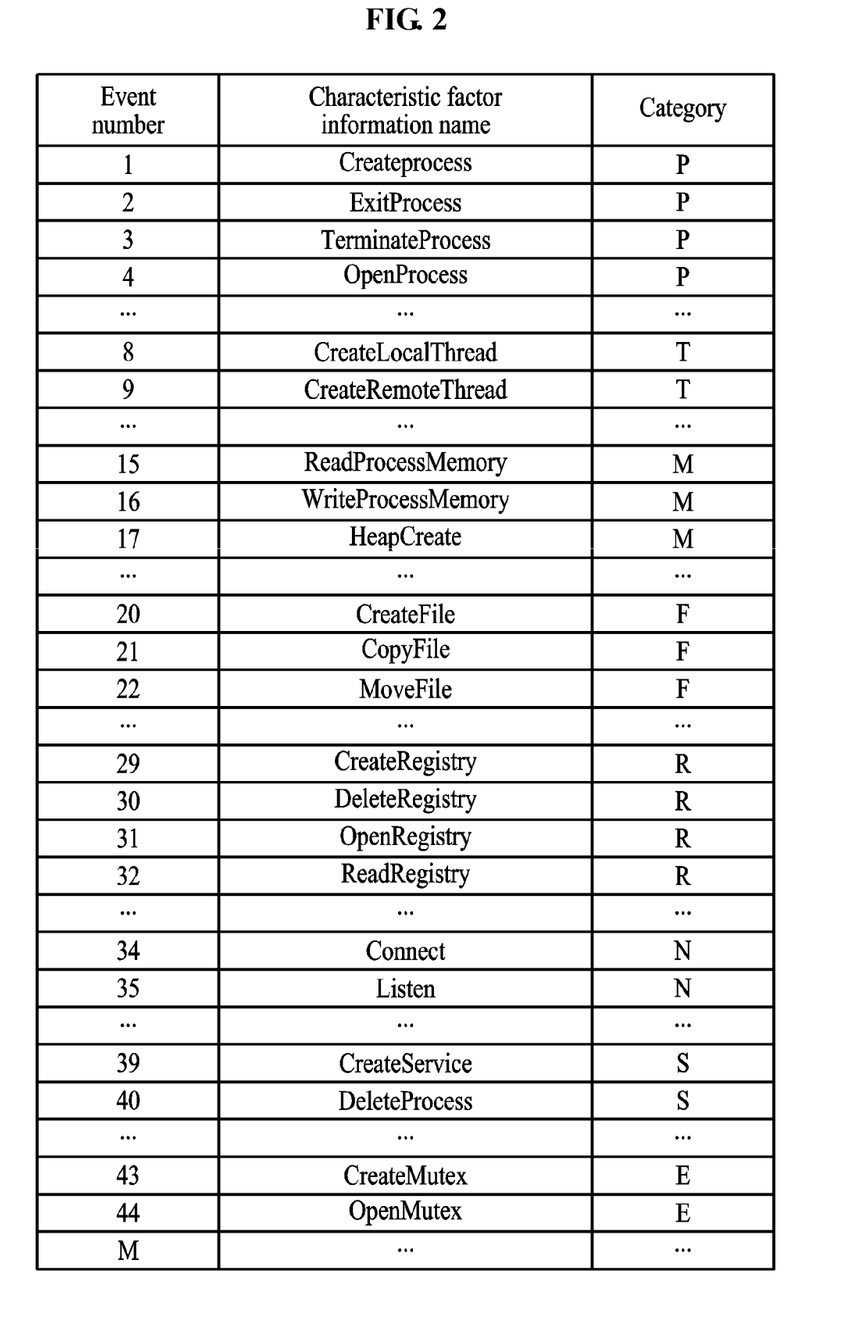
FIG. 2 illustrates an example of a definition of characteristic factor information according to an example embodiment.

FIG. 2 illustrates an example of a definition of characteristic factor information according to an example embodiment. In an embodiment, each characteristic factor information corresponds to one or more subroutine calls defined in an Application Programming Interface (API), the one or more subroutine calls each having a functionality corresponding to the characteristic factor information name.

Characteristic factor information occurring when a predetermined process is executed may be defined as a plurality of categories. For example, the malicious code learning apparatus 100 may define the characteristic factor information as belonging to one of eight categories as illustrated in FIG. 2.

Here, the defined categories may be described as a process P, a thread T, a file system F, a memory M, a registry R, a network N, a service S, and an Etc E.

For example, the malicious code learning apparatus 100 may define the characteristic factor information as belonging to a process category, for example, CreateProcess, ExitProcess, TerminateProcess, and OpenProcess, according to a preset rule.

The malicious code learning apparatus 100 may define the characteristic factor information as belonging to a memory category, for example, ReadProcessMemory, WriteProcessMemory, and HeapCreate.

Thus, the malicious code learning apparatus 100 may define a plurality of pieces of the characteristic factor information for each category.

Figure 3A:
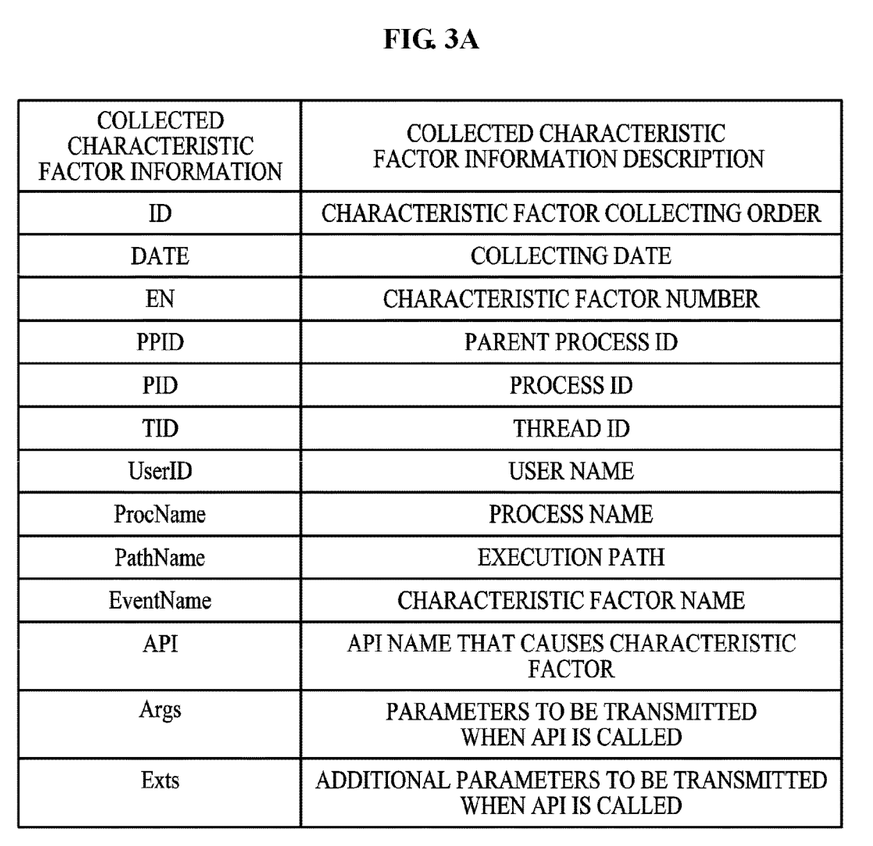
FIGS. 3A and 3B illustrate examples of collecting characteristic factor information according to an example embodiment.
Figure 3B:
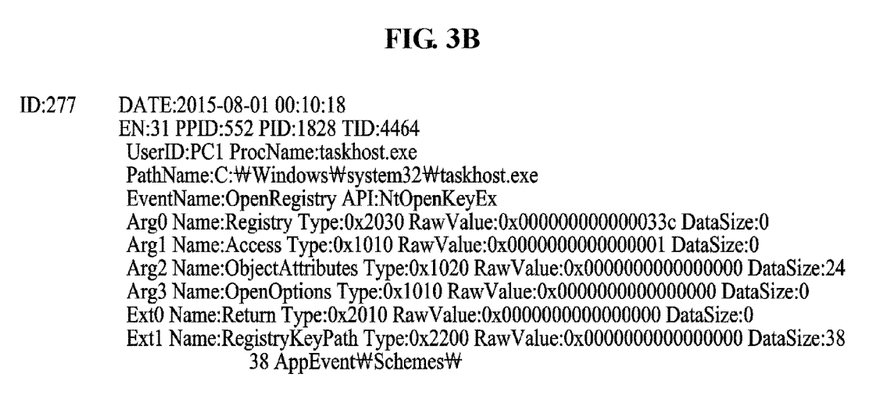

FIGS. 3A and 3B illustrate examples of collecting characteristic factor information according to an example embodiment.

As described above, the malicious code learning apparatus 100 may collect characteristic factor information using various methods. In an example, the malicious code learning apparatus 100 may collect the characteristic factor information using an application programming interface (API) hooking method.

In this example, from an execution start time of a training target process including a malicious code to an execution end time of the training target process including the malicious code, the learning apparatus 100 may collect the characteristic factor information in addition to various pieces of information as illustrated in FIG. 3A.

In this example, information collected with the characteristic factor information may be used to generate a feature vector for malicious code verification.

In detail, the information collected by the malicious code learning apparatus 100 may include at least one of a characteristic factor collecting order ID, a collecting date DATE, a characteristic factor number EN, a parent process identification (ID) PPID, a process ID PID, a thread ID TID, a user name UserID, a process name ProcName, an execution path PathName, a characteristic factor name EventName, an API name API that causes a characteristic factor, parameters Args to be transmitted when an API is called, and additional parameters Exts to be transmitted when an API is called. Hereinafter, a characteristic factor is also referred to as characteristic factor information.

For example, characteristic factor information OpenRegistry corresponding to an event number 31 of FIG. 2 may be collected as illustrated in FIG. 3B.

Figure 4:
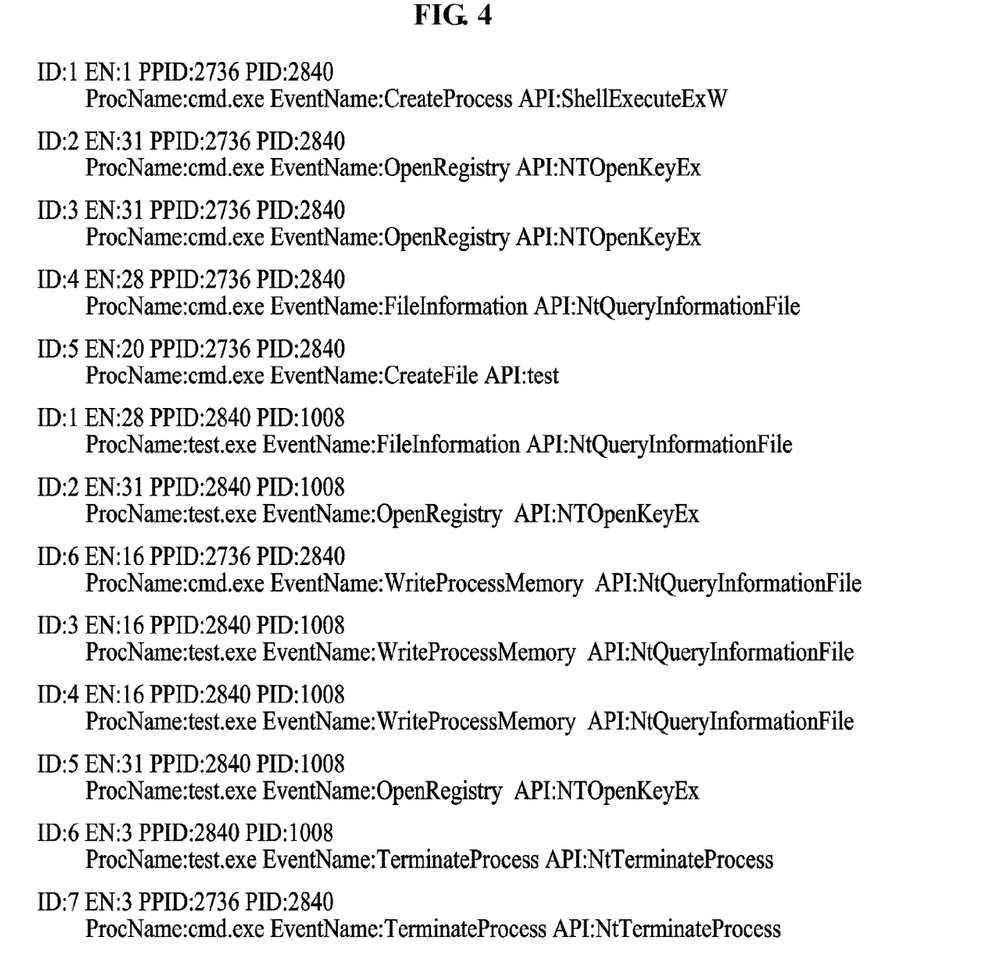
FIG. 4 illustrates an example of consecutively collected characteristic factor information according to an example embodiment.

FIG. 4 illustrates an example of consecutively collected characteristic factor information according to an example embodiment.

A user terminal, for example, a personal computer (PC), may consecutively execute a plurality of processes, and the malicious code learning apparatus 100 may collect characteristic factor information on each of the consecutively executed processes.

As illustrated in FIG. 4, the malicious code learning apparatus 100 may collect the characteristic factor information including seven pieces of information such as a characteristic factor collecting order ID, a characteristic factor number EN, a parent process ID PPID, a process ID PID, a process name ProcName, a characteristic factor name EventName, and an API name API that causes a characteristic factor, among various pieces of collected information including the characteristic information.

Here, the characteristic factor information collected by the malicious code learning apparatus 100 may be divided and collected for each process. For example, each characteristic factor collecting order ID may be matched to each process name ProcName as illustrated in FIG. 4.

Figure 5:
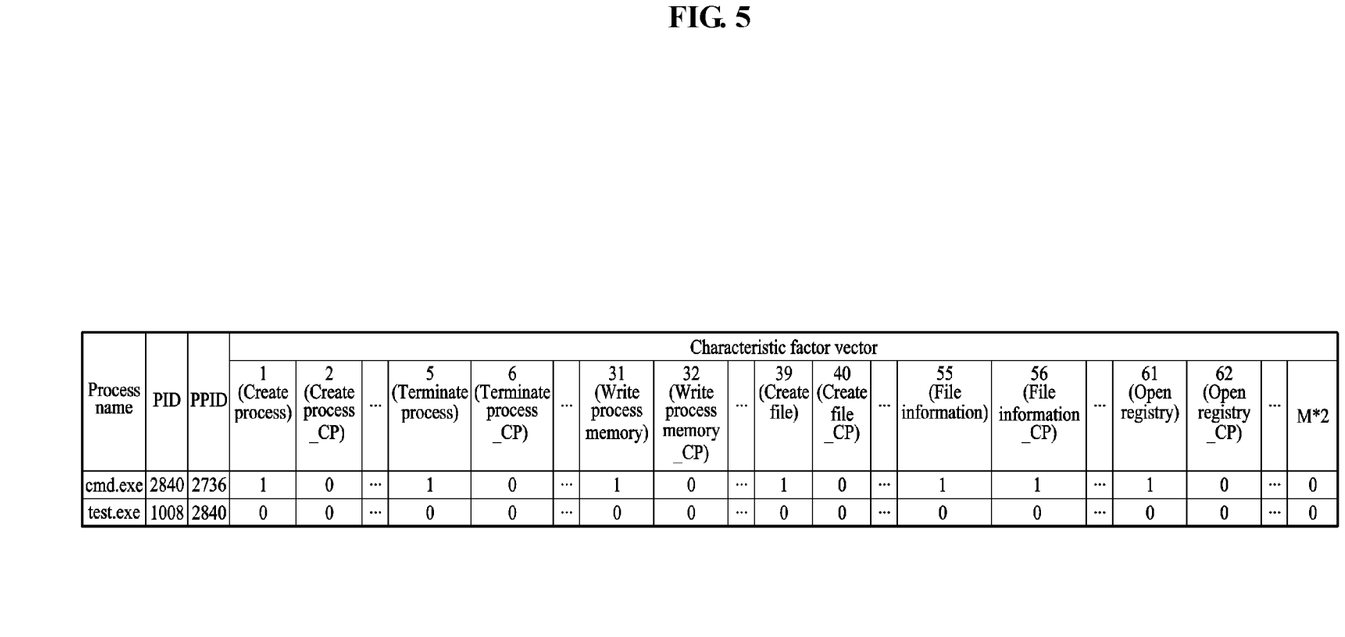
FIG. 5 illustrates an example of a result of reconstructing characteristic factor information based on a feature vector according to an occurrence frequency according to an example embodiment.

FIG. 5 illustrates an example of a result of reconstructing characteristic factor information into a feature vector according to an occurrence frequency according to an example embodiment.

The malicious code learning apparatus 100 may generate a feature vector for malicious code verification based on the characteristic factor information collected as illustrated in FIG. 4. Here, the malicious code learning apparatus 100 may generate the feature vector for the malicious code verification based on an occurrence frequency of the collected characteristic factor information.

Here, the feature vector generated based on the occurrence frequency may be generated using an occurrence number of predetermined characteristic factor information while each process is being executed, and an occurrence number of characteristic factor information occurring in a child process of a training target process in addition to a current training target process may be also considered.

For example, FIG. 5 illustrates an example of the feature vector generated based on the occurrence frequency using the consecutively collected characteristic factor information of FIG. 4. In FIG. 4, when a process of cmd.exe is executed, CreateProcess occurs once, TerminateProcess occurs once, WriteProcessMomery occurs once, CreateFile occurs once, FileInformation occurs once, and OpenRegistry occurs twice, so that seven pieces of characteristic factor information are collected. Also, when a process of test.exe is executed, TerminateProcess occurs once, WriteProcessMemory occurs once, CreateFile occurs once, FileInformation occurs once, and OpenRegistry occurs twice, so that six pieces of characteristic factor information are collected.

In FIG. 5, each of a plurality of pieces of the collected characteristic factor information is identical to a corresponding bin value. Since test.exe (PID: 1008) is a child process of cmd.exe (PID: 2840), an occurrence frequency of test.exe may be allocated to a child process value of cmd.exe.

For example, since WriteProcessMemory occurs twice in test.exe, a value of WriteProcessMemory_CP of cmd.exe may be set to "2". In the characteristic factor information, CP refers to a child process. When the feature vector is generated based on the occurrence frequency of the characteristic factor information of a process, an occurrence frequency of characteristic factor information occurring in the child process is also considered, such that a size of the feature vector generated based on the occurrence frequency may be twice a number M of pieces of characteristic factor information.

Since the feature vector generated based on the occurrence frequency is reconstructed to a vector of a fixed size, the feature vector may be learned by utilizing a plurality of machine learning algorithms, for example, a decision tree and a support vector machine (SVM), using the vector of the fixed size.

Here, a model of representing the malicious code and a model of representing a normal file generated based on the occurrence frequency learned by utilizing the plurality of machine learning algorithms may be stored in the storage 150 included in the malicious code learning apparatus 100.

Figure 6A:
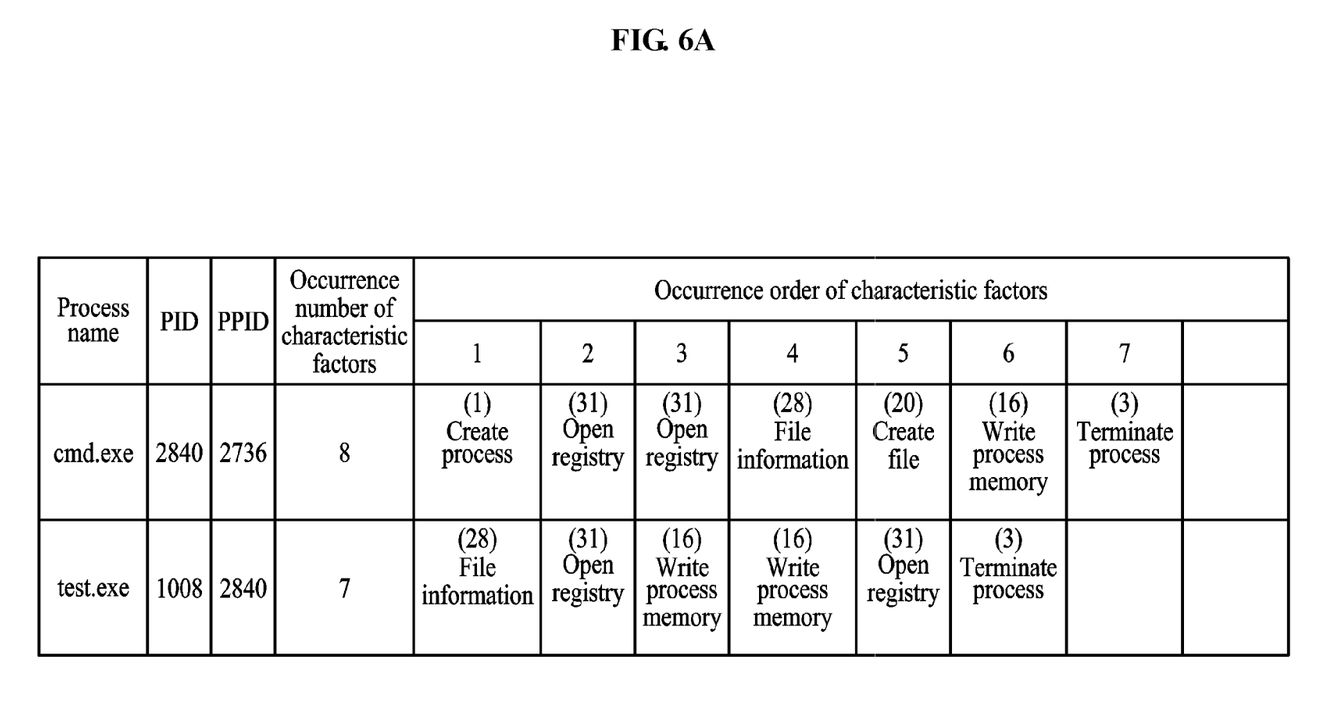
FIGS. 6A and 6B illustrate examples of a result of reconstructing characteristic factor information into a feature vector according to an occurrence order according to an example embodiment.
Figure 6B:
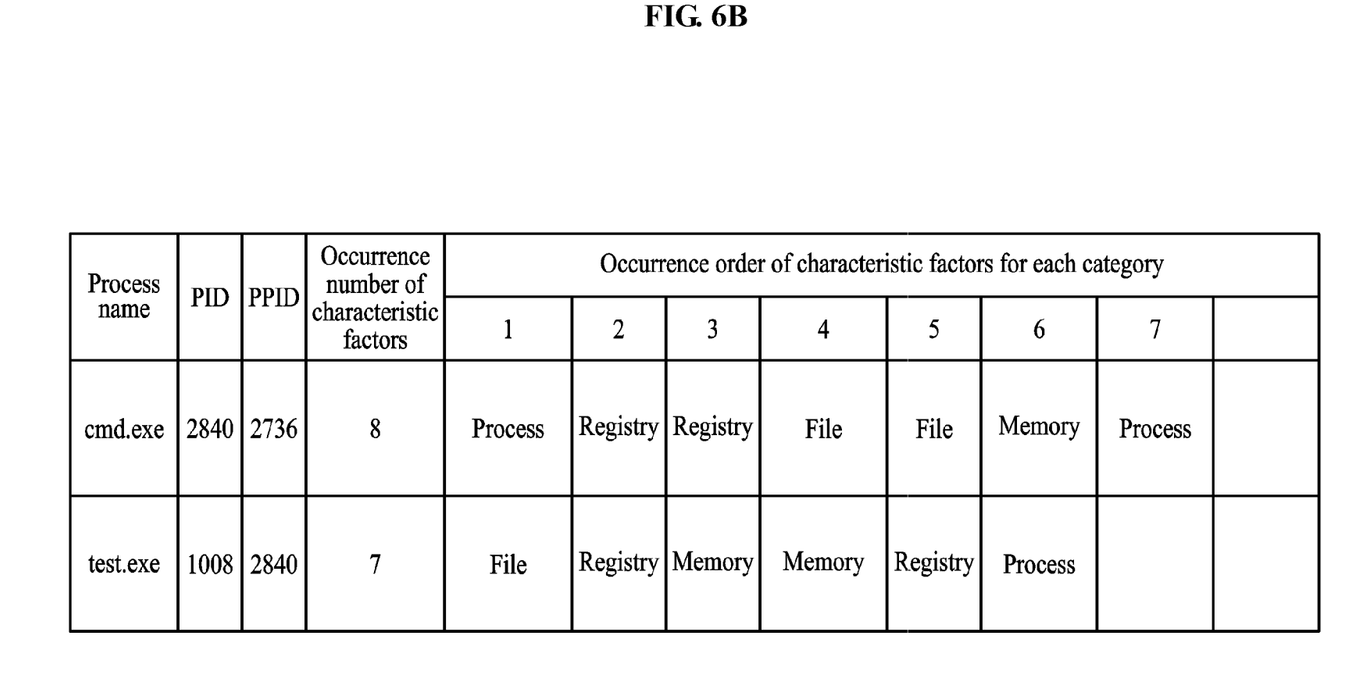

FIGS. 6A and 6B illustrate examples of a result of reconstructing characteristic factor information to a feature vector according to an occurrence order according to an example embodiment.

The malicious code learning apparatus 100 may generate a feature vector for malicious code verification based on the characteristic factor information collected as illustrated in FIG. 4. Here, the malicious code learning apparatus 100 may generate the feature vector for the malicious code verification based on an occurrence order of the collected characteristic factor information.

Here, the feature vector generated based on the occurrence order may be generated based on sequential information in which predetermined characteristic information is represented while each process is executed as illustrated in FIG. 6A.

For example, while a process of cmd.exe is executed, the malicious code learning apparatus 100 may collect the characteristic factor information in an order of CreateProcess, OpenRegistry, OpenRegistry, FileInformation, CreateFile, WriteProcessMemory, and TerminateProcess, and the feature vector may be generated using CreateProcess, OpenRegistry, OpenRegistry, FileInformation, CreateFile, WriteProcessMemory, and TerminateProcess.

The feature vector generated based on the occurrence order may be generated based on the sequential information in which categories of the predetermined characteristic factor information are represented while each process is being executed as illustrated in FIG. 6B.

For example, while cmd.exe is being executed, a first created piece of characteristic factor information CreateProcess of the characteristic factor information collected by the malicious code learning apparatus 100 corresponds to a Process category, and a second and third created piece of characteristic factor information OpenRegistry corresponds to a Registry category.

The malicious code learning apparatus 100 may generate the feature vector based on sequential information in which category information corresponding to each piece of the characteristic factor information is represented sequentially as illustrated in FIG. 6B.

Since the feature vector generated based on the occurrence order is represented based on the sequential information, the feature vector may be learned through a plurality of machine learning algorithms using the sequential information, for example, a hidden Markov model (HMM).

Here, a model of representing the malicious code and a model of representing a normal file generated based on the occurrence order learned by utilizing the plurality of machine learning algorithms may be stored in the storage 150 included in the malicious code learning apparatus 100.

Figure 7:
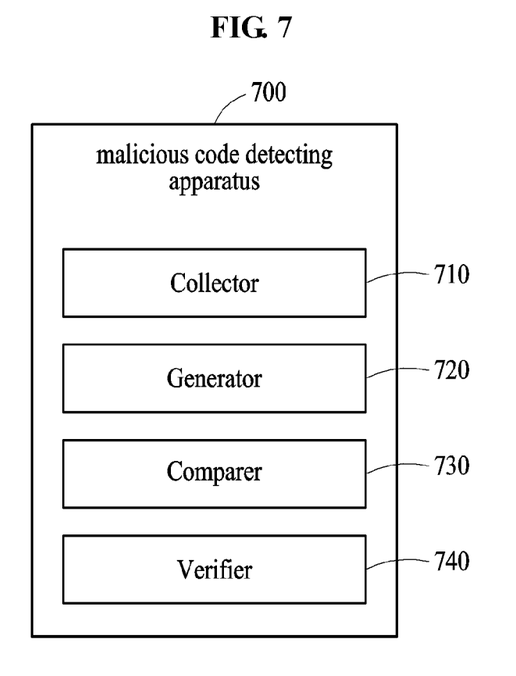
FIG. 7 is a block diagram illustrating an example of a malicious code detecting apparatus according to an example embodiment.

FIG. 7 is a block diagram illustrating an example of a malicious code detecting apparatus according to an example embodiment.

A malicious code detecting apparatus 700 includes a collector 710, a generator 720, a comparer 730, and a verifier 740. When the malicious code detecting apparatus 700 executes a target process to detect a malicious code, various pieces of characteristic factor information on a corresponding target process may be created.

The collector 710 may collect characteristic factor information from an execution start time of the target process to detect the malicious code to an execution end time of the target process to detect the malicious code. Here, the characteristic factor information collected by the collector 710 may be collected by various methods. In an example, the characteristic factor information may be collected by an application programming interface (API) hooking method.

For example, an API that causes characteristic factor information CreateProcess to create another process may include NtCreateProcess, NtCreateProcessEx, NtCreateUserProcess, CreateProcessWithLogonW, and CreateProcessWithTokenW. Therefore, from the execution start time of the target process to detect the malicious code to the execution end time of the target process to detect the malicious code, the collector 710 may collect the characteristic factor information CreateProcess when the API that causes the characteristic factor information CreateProcess to create another process is generated.

The generator 720 may generate a feature vector for malicious code verification based on the collected characteristic factor information. The collected characteristic factor information may be reconstructed for each process, and may be reconstructed in a form of the feature vector based on an occurrence order and an occurrence frequency of the characteristic factor information.

Repeated descriptions of the method of generating the feature vector based on the collected characteristic factor information will be omitted for increased clarity and conciseness because the descriptions provided with reference to FIGS. 5 through 6B are also applicable to FIG. 7.

The comparer 730 may compare the generated feature vector to a pre-stored model obtained through learning. Here, the pre-stored model may be a model generated by the malicious code learning apparatus 100. Specifically, the pre-stored model may be stored as a model of representing the malicious code and a model of representing a normal file by generating a feature vector using characteristic factor information collected when a training target process including a malicious code is executed, and learning the generated feature vector through a plurality of machine learning algorithms.

Here, the pre-stored model may be plural according to an occurrence order and an occurrence frequency of the characteristic factor information. For example, when a number of a plurality of machine learning algorithms using a vector of a fixed size is N and a number of a plurality of machine learning algorithms using sequential information is M, a number of pre-stored models may be N+M.

The comparer 730 may compare the N+M pre-stored models to the feature vector generated by the generator 720.

The verifier 740 may verify whether a malicious code is included in a target process based on a result of the comparing. The verifier 740 may finally verify whether the malicious code is included in the target process by performing fusion analysis on the N+M pre-stored models and the feature vector generated by the generator 720.

According to example embodiments described herein, a feature vector may be generated based on characteristic factor information collected when a process is executed, and malicious code detecting performance may be enhanced by verifying whether a malicious code is included in the process using the generated feature vector.

The units described herein may be implemented using hardware components, software components, or a combination thereof. For example, the hardware components may include microphones, amplifiers, band-pass filters, audio to digital converters, and processing devices. A processing device may be implemented using one or more general-purpose or special purpose computers, such as, for example, a processor, a controller and an arithmetic logic unit, a digital signal processor, a microcomputer, a field programmable array, a programmable logic unit, a microprocessor or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is singular; however, one skilled in the art will appreciate that a processing device may include multiple processing elements and multiple types of processing elements. For example, a processing device may include multiple processors or a processor and a controller. In addition, different processing configurations are possible, such a parallel processors.

The software may include a computer program, a piece of code, an instruction, or some combination thereof, to independently or collectively instruct or configure the processing device to operate as desired. Software and data may be embodied permanently or temporarily in any type of machine, component, physical or virtual equipment, computer storage medium or device, or in a propagated signal wave capable of providing instructions or data to or being interpreted by the processing device. The software also may be distributed over network coupled computer systems so that the software is stored and executed in a distributed fashion. The software and data may be stored by one or more non-transitory computer readable recording mediums.

The method according to the above-described embodiments may be recorded in non-transitory computer-readable media including program instructions to implement various operations embodied by a computer. The media may also include, alone or in combination with the program instructions, data files, data structures, and the like. The program instructions recorded on the media may be those specially designed and constructed for the purposes of the embodiments, or they may be of the kind well-known and available to those having skill in the computer software arts. Examples of non-transitory computer-readable media include magnetic media such as hard disks, floppy disks, and magnetic tape; optical media such as CD ROM disks and DVDs; magneto-optical media such as optical discs; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules in order to perform the operations of the above-described embodiments, or vice versa.

Although a few embodiments have been shown and described, the present invention is not limited to the described embodiments. Instead, it would be appreciated by those skilled in the art that changes may be made to these exemplary embodiments without departing from the principles and spirit of the invention, the scope of which is defined by the claims and their equivalents.

What is claimed is:

1. A computer-implemented malicious code learning method, comprising:
    executing, by a computer, a plurality of training processes;
    collecting, by the computer, characteristic factor information corresponding to events occurring in the executing;
    reconstructing, by the computer, the collected characteristic factor information for each of the plurality of training processes based on an occurrence order and an occurrence frequency;
    generating, by the computer, a first feature vector for malicious code verification based on the collected characteristic factor information reconstructed according to the occurrence order and generating a second feature vector for malicious code verification based on the collected characteristic factor information reconstructed according to the occurrence frequency; and extracting, by the computer, models representing the malicious code and a normal file by learning the generated first feature vector through each of a plurality of first machine learning algorithms and by learning the generated second feature vector through each of a plurality of second machine learning algorithms, wherein the models extracted through each of a plurality of first machine learning algorithms and through each of a plurality of second machine learning algorithms are used for detecting malicious code in a target process by performing fusion analysis.

2. The method of claim 1, wherein the first feature vector generated based on the occurrence order is generated from the sequentially represented characteristic factor information collected when the training processes comprising the malicious code is executed, or from sequentially represented category information corresponding to the collected characteristic factor information.

3. The method of claim 1, wherein the second feature vector generated based on the occurrence frequency is generated by considering the occurrence frequency of the characteristic factor information collected in the training processes comprising the malicious code and in a child process of the training processes.

4. The method of claim 1, wherein the extracting comprises learning the generated first feature vector through a plurality of first machine learning algorithms using sequential information when the generated first feature vector is generated based on the occurrence order of the collected characteristic factor information.

5. The method of claim 1, wherein the extracting comprises learning the generated second feature vector through a plurality of second machine learning algorithms using a vector of a fixed size when the generated second feature vector is generated based on the occurrence frequency of the collected characteristic factor information.

6. The method of claim 1, further comprising:
defining the characteristic factor information,
wherein the characteristic factor information comprises at least one of a process category, a thread category, a file system category, a memory category, a registry category, a network category, and a service category.

7. A malicious code detecting method, comprising:
collecting characteristic factor information when a target process to detect a malicious code is executed;
reconstructing the collected characteristic factor information for the target process based on an occurrence order and an occurrence frequency;
generating a first feature vector for malicious code verification based on the collected characteristic factor information reconstructed according to the occurrence order and generating a second feature vector for malicious code verification based on the collected characteristic factor information reconstructed according to the occurrence frequency;

comparing the generated first feature vector and the generated second feature vector to pre-stored models obtained through each of a plurality of first machine learning algorithms and a plurality of second machine learning algorithms; and
verifying whether the malicious code is comprised in the target process by performing a fusion analysis on a result of the comparing,
wherein the pre-stored models are stored as models representing the malicious code by generating the first feature vector and the second feature vector based on characteristic factor information collected when a training process comprising the malicious code is executed and by extracting the generated first feature vector obtained through each of a plurality of first machine learning algorithms and the generated second feature vector obtained through each of a plurality of second machine learning algorithms.

8. A malicious code detecting apparatus, comprising:
a processor; and
a non-transitory computer readable recording medium, wherein the processor executes computer programming instructions stored in the non-transitory computer readable recording medium to:
collect characteristic factor information when a target process to detect a malicious code is executed;
reconstructing the collected characteristic factor information for the target process based on an occurrence order and an occurrence frequency;
generate a first feature vector for malicious code verification based on the collected characteristic factor information reconstructed according to the occurrence order and generating a second feature vector for malicious code verification based on the collected characteristic factor information reconstructed according to the occurrence frequency;
compare the generated first feature vector and the generated second feature vector to pre-stored models obtained through each of a plurality of first machine learning algorithms and a plurality of second machine learning algorithms; and
verifying whether the malicious code is comprised in the target process by performing a fusion analysis on a result of the comparing,
wherein the pre-stored models are stored as models representing the malicious code by generating the first feature vector and the second feature vector based on characteristic factor information collected when a training process comprising the malicious code is executed and by extracting the generated first feature vector obtained through each of a plurality of first machine learning algorithms and the generated second feature vector obtained through each of a plurality of second machine learning algorithms.

* * * * *